United States Patent
Kojima et al.

(10) Patent No.: US 7,005,051 B2
(45) Date of Patent: Feb. 28, 2006

(54) PROCESS FOR FORMING LAYERED COATED FILM, AND LAYERED COATED FILM

(75) Inventors: Yoshio Kojima, Nara-ken (JP); Mitsuo Yamada, Osaka-fu (JP); Shoki Tsuji, Osaka-fu (JP)

(73) Assignee: Nippon Paint Co., Ltd., Osaka-Fu (JP)

( * ) Notice: Subject to any disclaimer, the term of this patent is extended or adjusted under 35 U.S.C. 154(b) by 506 days.

(21) Appl. No.: 10/107,372

(22) Filed: Mar. 28, 2002

(65) Prior Publication Data
US 2003/0059617 A1   Mar. 27, 2003

(30) Foreign Application Priority Data
Mar. 28, 2001   (JP)   ............................. 2001-092696

(51) Int. Cl.
   *C25D 13/10*   (2006.01)
(52) U.S. Cl. ................... 204/488; 204/506; 523/415
(58) Field of Classification Search ............... 204/488, 204/506; 523/415
   See application file for complete search history.

(56) References Cited

U.S. PATENT DOCUMENTS

| | | | | |
|---|---|---|---|---|
| 5,536,804 A | * | 7/1996 | Yamada et al. | ............... 528/45 |
| 5,770,642 A | * | 6/1998 | Kanato et al. | ............... 523/404 |
| 6,165,621 A | * | 12/2000 | Kasari et al. | ............... 428/457 |
| 6,353,057 B1 | * | 3/2002 | He et al. | ............... 525/124 |
| 6,428,856 B1 | | 8/2002 | Masuda et al. | |

FOREIGN PATENT DOCUMENTS

JP   2002-38104 A  *  2/2002

* cited by examiner

*Primary Examiner*—Kishor Mayekar
(74) *Attorney, Agent, or Firm*—Wenderoth, Lind & Ponack, L.L.P.

(57) ABSTRACT

Disclosed is a three coat one bake coating process for forming an intermediate coated film, a base coated film and a clear coated film on an electrodeposition coated film. The electrodeposition coating composition is a lead-free cationic electrodeposition coating composition which has a volatile organic content of 1% by weight or less, a metal ion content of 500 ppm or less, a neutralizing acid amount of 10 to 30 mg equivalent based on 100 g of binder resin solid content. The intermediate coating composition and/or the base coated composition comprises a specific amount of a nonaqueous dispersion resin as a resin component. In the coating process, a baking step is omitted from the conventional intermediate coating process, or from the conventional base coating process.

24 Claims, No Drawings

PROCESS FOR FORMING LAYERED COATED FILM, AND LAYERED COATED FILM

FIELD OF THE INVENTION

The present invention relates to a process for forming a layered coated film, more specifically, a process for forming a layered coated film which are conducted with using a lead-free cationic electrodeposition coating composition.

BACKGROUND OF THE INVENTION

In recent years, it has been strongly desired in the coating art, particularly the automobile coating art that coating process should be simplified and reduced so as to solve the problems of resource saving, cost saving, environmental load (such as VOC and HAPs) reducing, and the like.

In a conventional process for forming a layered coated film, each of coating compositions used to form a layered coated film, has been separately applied and cured. As to an automobile coating process for example, after an electrodeposition coating composition has been applied and cured, curing step is conducted 3 times in every coating step for an intermediate coating composition, an base coating composition, and a clear coating composition. This conventional process for automobile coating is generally referred to as 3 coat 3 bake coating process.

In order to simplify the automobile coating process, 3 coat 1 bake coating process has also been proposed. In this coating process, an intermediate coating composition, an base coating composition, and an top coating composition are sequentially applied on the cured electrodeposition coated film by wet on wet, thereafter the layered wet coated film is heated and cured together. Thereby, curing process is reduced to one time.

However, if the 3 coat 1 bake coating process is conducted with using a conventional electrodeposition coating composition, it is insufficient in throwing power, unevenness of film thickness occurs, and the thicker part leads wasteful consumption of the coating composition. Further, if the electrodeposition coated film is uneven in thickness, the coated films applied thereon becomes poor in surface smoothness.

In addition, if the 3 coat 1 bake coating process is conducted with using a conventional intermediate coating composition and base coating composition, coated layers may be solubilized with each other or inverted, and appearance of the coated surface becomes poor.

SUMMARY OF THE INVENTION

The present invention solves the above-mentioned problems of the background art, and it is an object of the present invention to provide a 3 coat 1 bake coating process which has better economical efficiency than the conventional 3 coat 3 bake coating process and produces comparable appearance with that produced by the conventional 3 coat 3 bake coating process.

In the 3 coat 1 bake coating process, a baking step is omitted from the conventional intermediate coating process, or from the conventional base coating process, therefore the problems of process simplifying, cost saving, energy consumption saving, environmental load reducing, are solved, and new coating system which exerts high throwing power, is provided.

The present invention provides a process for forming a layered coated film comprising: a step I in which an electrodeposition coated film is formed on a substrate to be coated by an electrodeposition coating process with using a cationic electrodeposition coating composition, and the electrodeposition coated film is heated to form a cured electrodeposition coated film; a step II in which an intermediate coating composition is applied to the cured electrodeposition coated film to form an uncured intermediate coated film; a step III in which a base coating composition is applied to the uncured intermediate coated film to form an uncured base coated film; a step IV in which a clear coating composition is applied to the uncured base coated film to form an uncured clear coated film; and a step V in which the uncured intermediate coated film, base coated film, and clear coated film are simultaneously heated and cured; wherein
the cationic electrodeposition coating composition is a lead-free cationic electrodeposition coating composition which comprises an aqueous medium, a binder resin composed of a cationic epoxy resin and a blocked isocyanate curing agent dispersed or dissolved in the aqueous medium, a neutralizing acid in order to neutralize the cationic epoxy resin, an organic solvent, and a metal catalyst, and which has a volatile organic content of 1% by weight or less, a metal ion content of 500 ppm or less, a neutralizing acid amount of 10 to 30 mg equivalent based on 100 g of binder resin solid content, and
the intermediate coating composition comprises a resin component composed of 10 to 70% by weight solid based on total resin solid of a hydroxyl group containing resin (a), 10 to 70% by weight of a curing agent reactable with hydroxyl group (b), 18 to 50% by weight of a nonaqueous dispersion resin (c), with the proviso (a)+(b)+(c)=100%, and a pigment component.

Further, the present invention provides a process for forming a layered coated film comprising: a step I in which an electrodeposition coated film is formed on a substrate to be coated by an electrodeposition coating process with using a cationic electrodeposition coating composition, and the electrodeposition coated film is heated to form a cured electrodeposition coated film; a step II in which an intermediate coating composition is applied to the cured electrodeposition coated film to form an uncured intermediate coated film; a step III in which a base coating composition is applied to the uncured intermediate coated film to form an uncured base coated film; a step IV in which a clear coating composition is applied to the uncured base coated film to form an uncured clear coated film; and a step V in which the uncured intermediate coated film, base coated film, and clear coated film are simultaneously heated and cured; wherein
the cationic electrodeposition coating composition is a lead-free cationic electrodeposition coating composition which comprises an aqueous medium, a binder resin composed of a cationic epoxy resin and a blocked isocyanate curing agent dispersed or dissolved in the aqueous medium, a neutralizing acid in order to neutralize the cationic epoxy resin, an organic solvent, and a metal catalyst, and which has a volatile organic content of 1% by weight or less, a metal ion content of 500 ppm or less, a neutralizing acid amount of 10 to 30 mg equivalent based on 100 g of binder resin solid content, and
the base coating composition comprises a resin component composed of 10 to 70% by weight solid based on total resin solid of a hydroxyl group containing resin (d), 10 to 70% by weight of a curing agent reactable with hydroxyl group (e), 5 to 50% by weight of a nonaqueous dispersion resin (f), with the proviso (d)+(e)+(f)=100%, and a pigment component.

Further the present invention provides a process for forming a layered coated film comprising: a step I in which an electrodeposition coated film is formed on a substrate to be coated by an electrodeposition coating process with using a cationic electrodeposition coating composition, and the electrodeposition coated film is heated to form a cured electrodeposition coated film; a step II in which an intermediate coating composition is applied to the cured electrodeposition coated film to form an uncured intermediate coated film; a step III in which a base coating composition is applied to the uncured intermediate coated film to form an uncured base coated film; a step IV in which a clear coating composition is applied to the uncured base coated film to form an uncured clear coated film; and a step V in which the uncured intermediate coated film, base coated film, and clear coated film are simultaneously heated and cured; wherein the cationic electrodeposition coating composition is a lead-free cationic electrodeposition coating composition which comprises an aqueous medium, a binder resin composed of a cationic epoxy resin and a blocked isocyanate curing agent dispersed or dissolved in the aqueous medium, a neutralizing acid in order to neutralize the cationic epoxy resin, an organic solvent, and a metal catalyst, and which has a volatile organic content of 1% by weight or less, a metal ion content of 500 ppm or less, a neutralizing acid amount of 10 to 30 mg equivalent based on 100 g of binder resin solid content, and the intermediate coating composition comprises a resin component composed of 10 to 70% by weight solid based on total resin solid of a hydroxyl group containing resin (a), 10 to 70% by weight of a curing agent reactable with hydroxyl group (b), 18 to 50% by weight of a nonaqueous dispersion resin (c), with the proviso (a)+(b)+(c)=100%, and a pigment component.

the base coating composition comprises a resin component composed of 10 to 70% by weight solid based on total resin solid of a hydroxyl group containing resin (d), 10 to 70% by weight of a curing agent reactable with hydroxyl group (e), 5 to 50% by weight of a nonaqueous dispersion resin (f), with the proviso (d)+(e)+(f)=100%, and a pigment component.

DETAILED DESCRIPTION OF THE INVENTION

A process for forming a layered coated film of the present invention comprises the following steps I to V.

Step I

In step I of the present invention, a cationic electrodeposition coating composition is applied on a substrate to be coated, and the electrodeposition coated film is cured by heating.

The cationic electrodeposition coating composition employed in the present invention is a lead-free cationic electrodeposition coating composition. The wording "lead-free" means that lead is not substantially contained, i.e., lead is not present in an amount so as to exert an influence on the environment. Specifically it means that lead is not present in an electrodeposition bath beyond 50 ppm, preferably beyond 20 ppm.

An electrodeposition coating composition contains binder, pigment, solvent and various kinds of additives such as an anticorrosion agent in an aqueous medium. The binder contains a cationic resin having a functional group and a curing agent for curing the cationic resin. As the aqueous medium, ion-exchanged water, deionized water, and the like are employed.

In the present invention, a cationic epoxy resin which is obtainable by allowing an active hydrogen compound such as amine to react with an epoxy ring of an epoxy resin to introduce a cationic group by opening the epoxy group, is used as the cationic resin, and a block polyisocyanate in which an isocyanate group of polyisocyanate is blocked is used as the curing agent.

Cationic Epoxy Resin

The cationic epoxy resin used in the present invention includes an amine modified epoxy resin. The cationic epoxy resin may be those disclosed in Japanese Patent Kokai Publications No. Sho 54-4978 and Sho 56-34186.

The cationic epoxy resin is typically prepared by opening all epoxy rings in a bisphenol type epoxy resin by an active hydrogen compound which can introduce a cationic group, or by opening a part of epoxy rings by the other active hydrogen compound, while opening the remaining epoxy rings by an active hydrogen compound which can introduce a cationic group.

A typical example of the bisphenol type epoxy resin is the bisphenol A type or the bisphenol F type epoxy resin. The former is commercially available in the names of EPICOAT™ 828 (Yuka-Shell Epoxy Co. Ltd., epoxy equivalent 180 to 190), EPICOAT™ 1001 (epoxy equivalent 450 to 500), EPICOAT™ 1010 (epoxy equivalent 3000 to 4000) and the like, and the latter is commercially available in the name of EPICOAT™ 807 (epoxy equivalent 170) and the like.

An oxazolidone ring containing epoxy resin as described by chemical formula 3 of paragraph [0004] in Japanese Patent Kokai Publication No. Hei 5-306327 may be used as the cationic epoxy resin. This is because a coated film which is superior in throwing power, heat resistance and corrosion resistance can be obtained.

An oxazolidone ring is introduced into an epoxy resin, for example, by the step of heating a block polyisocyanate which is blocked by lower alcohol such as methanol and a polyepoxide in the presence of basic catalyst with removing lower alcohol generated as byproduct by distillation.

Especially preferred epoxy resin is an oxazolidone ring containing epoxy resin. This is because a coated film which is superior in heat resistance and corrosion resistance, as well as superior in shock resistance can be obtained.

It is known that an oxazolidone ring containing epoxy resin can be obtained by allowing a bi-functional epoxy resin to react with a diisocyanate that is blocked by monoalcohol (i.e., bisurethane). Specific examples and preparation methods of the oxazolidone ring containing epoxy resin are disclosed, for example, in paragraphs [0012] to [0047] of Japanese Patent Kokai Publication No. 2000-128959.

Block Polyisocyanate Curing Agent

Polyisocyanate used for the curing agent of the present invention refers to a compound having two or more isocyanate groups in one molecule. For example, as the polyisocyanate, it may be any of aliphatic, alicyclic, aromatic and aromatic-aliphatic.

Specific examples of the polyisocyanate include aromatic diisocyanates such as tolylenediisocyanate (TDI), diphenylmethanediisocyanate (MDI), p-phenylenediisocyanate and naphthalenediisocyanate; aliphatic diisocyanates having 3 to 12 carbon atoms such as hexamethylenediisocyanate (HDI), 2,2,4-trimethylhexanediisocyanate and lysinediisocyanate; alicyclic diisocyanates having 5 to 18 carbon atoms such as 1,4-cyclohexanediisocyanate (CDI), isophoronediisocyanate (IPDI), 4,4'-dicyclohexylmethanediisocyanate (hydrogenated MDI), methylcyclohexanediisocyanate, isopropylidene dicyclohexyl-4,4'-diisocyanate and 1,3-isocyanatomethyl cyclohexane (hydrogenated XDI), hydrogenated TDI, 2,5- or 2,6-bis (isocyanatometyl) bicyclo [2.2.1] heptane (also referred to as norbornanediisocyanate); aliphatic diisocyanates having an aromatic ring such as xylylenediisocyanate (XDI) and tetramethylxylylenediisocyanate (TMXDI); and modified diisocyanates (urethanation compounds, carbodiimide, urethodione, urethoimine, biuret and/or isocyanurate modified compounds). These may be used alone or in combination of two or more.

An adduct or a prepolymer that can be obtained by reacting polyisocyanate with polyalcohol such as ethylene glycol, propylene glycol, trimethylolpropane or hexatriol at a NCO/OH ratio of not less than 2 can also be used as a curing agent.

A block agent is those capable of adding to a polyisocyanate group, and reproducing a free isocyanate when heated to dissociation temperature though it is stable at ambient temperature.

As a block agent, those conventionally employed such as ε-caprolactam and ethylene glycol monobutyl ether may be employed. However, many of the volatile block agents among these are regulated as being HAPs, and preferably be used in minimum amount.

Pigment

An electrodeposition coating composition generally contains pigment as a colorant. Examples of such pigment include titanium white, carbon black and colcothar. However, it is preferred that an electrodeposition coating composition employed in the present invention does not contain pigment. This is because throwing power of the coating composition improves.

As to an extender pigment, or a rust preventive pigment, they may be included in order to provide corrosion resistance to a coated film. The amount however is preferably a ratio of 1/9 or less by weight based on a resin solid contained in the coating composition (P/V). If the ratio of the pigment is more than 1/9 by weight, throwing power of the coating composition becomes poor, and it results in wasteful consumption of the coating composition.

Examples of such pigment may be employed in the lead-free cationic electrodeposition coating composition employed in the present invention include extender pigments such as kaolin, talc, aluminum silicate, calcium carbonate, mica, clay and silica, rust preventive pigments such as zinc phosphate, iron phosphate, aluminum phosphate, calcium phosphate, zinc phosphite, zinc cyamide, zinc oxide, aluminum tripoliphosphate, zinc molybdate, aluminum molybdate, calcium molybdate, aluminum phosphomolybdate, and aluminum zinc phosphomolybdate.

Pigment Dispersion Paste

When pigment is used as a component of an electrodeposition coating composition, generally, the pigment is dispersed in an aqueous medium at high concentration in advance and made into a paste form. This is because pigment is of the powder form, and it is difficult to be dispersed uniformly into low concentration which is used in the electrodeposition coating composition, by one step process. Such a paste is generally referred to as a pigment dispersion paste.

A pigment dispersion paste is prepared by allowing pigment to disperse in an aqueous medium together with a pigment dispersing resin. Generally, as the pigment dispersing resin, cationic or nonionic low molecular weight surface active agents or cationic polymers such as modified epoxy resins having a quaternary ammonium group and/or a tertiary sulfonium group are used. As the aqueous medium, ion-exchange water or water containing a small amount of alcohol is used. Generally, the pigment dispersing resin and the pigment are used in a solid content ratio of 5 to 40 parts by weight to 20 to 50 parts by weight.

Metal Catalyst

A metal catalyst may be included in the lead-free cationic electrodeposition coating composition employed in the present invention in the form of metal ion as a catalyst for improving corrosion resistance of a coated film. The metal ion includes preferably cerium ion, bithmuth ion, copper ion, and zinc ion. These are incorporated in the electrodeposition coating composition in the form of an eluted component derived from salts combined with suitable acids, or pigments composed of the corresponding metal. The acids may be any of inorganic or organic acids described later as a neutralizing acid such as hydrochloric acid, nitric acid, phosphoric acid, formic acid, acetic acid, and lactic acid. Preferred acid is the acetic acid.

The lead-free cationic electrodeposition coating composition employed in the present invention contains the metal catalyst in an amount so that metal ion concentration in the coating composition is 500 ppm or less. This is because an influence exerted on the environment is minimized. Preferably, the metal ion concentration in the coating composition is 200 to 400 ppm.

As to an amount of the metal ion, when the pigment is employed in the coating composition, it must be noticed that the metal ion may also be eluted from the pigment. Thus, the combination amount of the metal catalyst should be controlled with considering an amount of the metal ion eluted from the pigment. Examples of the metal ion eluted from the pigment include zinc ion, molybdenum ion, aluminium ion and the like.

If the metal ion is included in the electrodeposition coating composition in an amount of more than 500 ppm, an influence exerted on the environment becomes too large, deposition property of a binder resin becomes poor, and throwing power of the coating composition becomes poor. The metal ion concentration of the electrodeposition coating composition is measured by conducting atomic absorption analysis on a supernatant liquid obtained by centrifugal separation of the coating composition.

Lead-Free Electrodeposition Coating Composition

A cationic electrodeposition coating composition employed in the present invention is prepared by dispersing the metal catalyst, the cationic epoxy resin, the block polyisocyanate curing agent, and the pigment dispersion paste in an aqueous medium. In addition to these, the aqueous medium usually includes a neutralizing acid so that the cationic epoxy resin is neutralized to improve dispersibility of a binder resin emulsion. The neutralizing acid includes inorganic and organic acids such as hydrochloric acid, nitric acid, phosphoric acid, formic acid, acetic acid, and lactic acid.

When the coating composition includes a large amount of neutralizing acid, neutralizing ratio of the cationic epoxy resin becomes high, the binder resin particles have high affinity with the aqueous medium, and dispersion stability thereof increases. This means that the binder resin particles hardly deposit on the substrate when electrodeposition coating is conducted, and means poor deposition property.

On the other hand, when the coating composition includes a small amount of neutralizing agent, neutralizing ratio of the cationic epoxy resin becomes low, the binder resin particles have low affinity with the aqueous medium, and dispersion stability thereof decreases. This means that the binder resin particles easily deposit on the substrate when electrodeposition coating is conducted, and means good deposition property.

Thus, in order to improve throwing power of the electrodeposition coating composition, it is preferred that an amount of the neutralizing acid included in the coating composition is reduced to control neutralizing ratio of the cationic epoxy resin to low level.

The neutralizing acid is specifically contained in an amount so as to be 10 to 30 mg eq., preferably 15 to 25 mg eq. based on 100 g of a resin solid of the binder which includes the cationic epoxy resin and the block isocyanate curing agent. If the amount of the neutralizing agent is less than 10 mg eq., the binder resin particles are insufficient or lack in affinity with water, and poor in dispersion stability. If the amount is more than 30 mg eq., the coating solid decreases in deposition property, a large quantity of electricity is required for conducting deposition, and throwing power also becomes poor.

In the present specification, the amount of the neutralizing acid is represented by milligram equivalent value based on 100 g of the binder resin solid which is contained in the coating composition, and is referred to as MEQ(A).

The amount of the block polyisocyanate curing agent is such that it is satisfactory to react with an active hydrogen containing functional group such as a primary, secondary and/or tertiary amino group or a hydroxyl group in the cationic epoxy resin at the time of heat curing and to give a preferable cured coated film. It is generally 50/50 to 90/10, preferably 65/35 to 80/20 when represented by solid content ratio by weight of the cationic epoxy resin based on the block polyisocyanate curing agent.

The cationic electrodeposition coating composition employed in the present invention may contain a tin compound such as dibutyltin dilaurate or dibutyltin oxide, or a usual urethane cleavage catalyst. The addition amount thereof is preferably 0.1 to 5.0% by weight of a resin solid.

An organic solvent is essentially required as a solvent when resin components such as a cationic epoxy resin, a block polyisocyanate curing agent, and a pigment dispersing resin and the like are prepared, and complicated procedure is required for removing the organic solvent completely. Further, when an organic solvent is contained in a binder resin, fluidity of coated film at the time of film forming improves, and smoothness of the coated film improves.

Examples of the organic solvent usually contained in the coating composition include ethylene glycol monobutyl ether, ethylene glycol monohexyl ether, ethylene glycol mono-2-ethylhexyl ether, propylene glycol monobutyl ether, dipropylene glycol monobutyl ether, propylene glycol monophenyl ether, and the like.

Therefore, an organic solvent have not been completely removed from a resin component conventionally, otherwise an organic solvent is added to the electrodeposition coating composition, thereby VOC (volatile organic content) of the coating composition is adjusted about from 1 to 5% by weight. In this context, the "volatile organic" means the organic solvent having a boiling point of 250° C. or less, the examples include the above described organic solvents.

On the other hand, the lead-free cationic electrodeposition coating composition employed in the present invention has the organic solvent content lower than that used to be. This is because a bad influence on the environment is prevented. Specifically, the coating composition is controlled to have a VOC of not more than 1% by weight, preferably 0.5 to 0.8% by weight, more preferably 0.2 to 0.5% by weight. If VOC of the coating composition is more than 1% by weight, an influence exerted on the environment becomes large, electric resistance of the coated film decreases due to flowability improvement of the coated film, and throwing power becomes poor.

As to the method for controlling VOC not more than 1% by weight, for example, an organic solvent employed for viscosity control at the time of conducting reaction may be reduced in its content by the reaction being conducted at higher temperature in lower solvent. An organic solvent inevitably employed at the time of conducting reaction, may be recovered by a desolvation process by such a means of employing a low boiling-point solvent, thereby VOC of the end product may be reduced. An organic solvent employed for viscosity control at the time of coating may be reduced in its content by modifying the resin with soft segment so as to have lower.

VOC may be determined by measuring amount of an organic solvent contained in the electrodeposition coating composition according to the gas liquid chromatography method by using internal standard.

In addition, the lead-free cationic electrodeposition coating composition employed in the present invention may contain commonly used additives for coating composition such as water miscible organic solvent, surface active agent, oxidation inhibiting agent and ultraviolet absorbing agent.

Electrodeposition Coating Process

In a process for forming an electrodeposition coated film of step I, the lead-free cationic electrodeposition coating composition is coated by electrodeposition coating process on a substrate to be coated to form electrodeposition coated film (uncured). The substrate is not limited to but those having conductivity, and iron plate, steel plate, aluminum plate, and surface-treated objects thereof, and molded objects thereof can be exemplified.

Electrodeposition coating is carried out, in general, by filling an electrodeposition bath with the electrodeposition coating composition, and applying a voltage of usually 50 to 450 V between the substrate serving as cathode and anode. If the applied voltage is less than 50 V, the electrodeposition becomes insufficient, and if the applied voltage exceeds 450 V, the coated film may be broken and appearance thereof becomes unusual.

The electrodeposition process preferably comprises the steps of (i) immersing a substrate to be coated in an electrodeposition coating composition, and (ii) applying a voltage between the substrate as cathode and anode to cause deposition of coated film. Also, the period of time for applying the voltage can be generally 2 to 4 minutes, though it varies with the electrodeposition condition. The electrodeposition bath temperature is usually controlled at 10 to 45° C.

Thickness of the electrodeposition coated film is preferably 10 to 20 um. If it is less than 10 um, rust resistance is insufficient, and if it exceeds 20 um, it leads waste of the coating composition.

The electrodeposition coated film obtained in the manner as described above is baked at a temperature of 120 to 260° C., preferably 160 to 220° C. for 10 to 30 minutes to be cured directly or after being washed with water after completion of the electrodeposition process.

Step II

In step II of the present invention, an intermediate coating composition is applied on the cured electrodeposition coated film to form an uncured intermediate coated film.

Intermediate Coating Composition

The intermediate coating composition comprises a resin component and a pigment component. The resin component is composed of 10 to 70% by weight solid based on total resin solid of a hydroxyl group containing resin (a), 10 to 70% by weight of a curing agent reactable with hydroxyl group (b), 18 to 50% by weight of a nonaqueous dispersion resin (c), with the proviso (a)+(b)+(c)=100%.

The hydroxyl group containing resin (a) means the resin which has a hydroxyl group and is soluble in a medium employed for the intermediate coating composition, for example includes an acrylic resin and/or a polyester resin. The acrylic resin is preferred because the resulting hydroxyl group containing resin (a) may be designed to have high solubility parameter. The polyester resin includes those derived from polyol and polycarboxylic acid or anhydride thereof.

The hydroxyl group containing resin (a) preferably has a hydroxyl value of 50 to 250, an acid value 1 to 50 mgKOH/g, and a solubility parameter of 9.5 to 12. If the hydroxyl value, acid value, or solubility parameter is more than the upper limits, the resulting coated film decreases in water resistance. If the hydroxyl value or acid value is less than the lower limits, the coating composition decreases in curability, and if the solubility parameter is less than the lower limit, the coated layer may be solubilized with a base coated film.

The hydroxyl group containing resin (a) has a number average molecular weight of 1000 to 10000, preferably 1100 to 5000, more preferably 1200 to 3000. By employing the resin (a) of such a molecular weight, the intermediate coating composition can be made to high solid type, it becomes small in volume shrinkage during a baking step, and appearance of the resulting coated film improves.

The hydroxyl group containing resin (a) is included in an amount of 10 to 70% by weight solid based on total resin solid of the intermediate coating composition. If the amount is less than 10% by weight, the resulting coated film becomes brittle, or becomes poor in appearance, and deteriorates in basic property as a coated film. If the amount is more than 70% by weight, an amount of the nonaqueous dispersion resin (c) to be combined decreases, and appearance of the resulting coated film becomes poor. The amount is preferably 10 to 50% by weight, more preferably 20 to 50% by weight.

The curing agent reactable with hydroxyl group (b) is not limited to, but includes, for example a melamine resin and/or a block isocyanate resin, and the like. The curing agent (b) is included in an amount of 10 to 70% by weight solid based on total resin solid of the intermediate coating composition. If the amount is less than 10% by weight, curability may become insufficient, or physical property of the coated film may become poor. If the amount is more than 70% by weight, disadvantage in economy may be caused, and appearance of the resulting coated film becomes poor. The amount is preferably 20 to 50% by weight.

A combination of the hydroxyl group containing resin (a) and the curing agent reactable with hydroxyl group (b) is not limited to, but preferably is a combination of acrylic resin and/or polyester resin, and melamine resin when pigment dispersing property and working property are considered.

The nonaqueous dispersion resin (c) is a particulate resin composed of a core part having high solubility parameter, and a shell part having low solubility parameter. The resin particles are not soluble in a solvent in the coating composition due to high solubility parameter of the core part, and also have small swelling ratio by a solvent. Further, the core part serves as a viscosity imparting agent, thereby coated layers are prevented from being solubilized or inverted with each other, and color reversion due to slight mixing with the base coated film is also prevented. The shell part having low solubility parameter serves as a dispersion stabilizer.

The nonaqueous dispersion resin (c) is made of uncrosslinked particles, and minimum viscosity during a baking step can be made small. The particles however may be crosslinked by the curing agent reactable with hydroxyl group (b), may serve as a film forming component, and may be included in increased amount. Therefore, the intermediate coated film improves in hiding property, distinctiveness, gloss and the like by the nonaqueous dispersion resin (c).

The nonaqueous dispersion resin (c) preferably has a solubility parameter of 11 to 14, and a solubility parameter difference between the core part and the shell part of 0.5 to 3. If the difference is less than 0.5, nonvolatile solid content of the coating composition cannot sufficiently be reduced, dissolution and swelling may be caused. Further, viscosity control effect exerted by the core part decreases, hiding property deteriorates, solubilization with the base coated film occurs, and appearance of the resulting coated film becomes insufficient.

If the difference is more than 3, dispersion becomes unstable, separation may occur, inverse or crack may be caused by the intermediate coated film being mixed with the base coated film. The difference of the solubility parameter is preferably 1 to 3.

As to correlation between the solubility parameters of the hydroxyl group containing resin (a) and the nonaqueous dispersion resin (c), it is preferred that the nonaqueous dispersion resin (c) has higher solubility parameter because solubilization with the base coated film may be prevented.

The nonaqueous dispersion resin (c) has a hydroxyl value of 100 to 400, preferably 130 to 300. If the hydroxyl value is less than 100, curability of the coating composition decreases, and if it is more than 400, water resistance of the coated film may decrease. The resin (c) has an acid value of 0 to 200 mgKOH/g, preferably 0 to 50 mgKOH/g. If the acid value is more than 200 mgKOH/g, water resistance of the coated film decreases. The resin (c) has an average diameter ($D_{50}$) of 0.05 to 5 um, preferably 0.05 to 1 um. If the average diameter is less than 0.05 um, nonvolatile solid content of the coating composition decreases, and if it is more than 5 um, viscosity control property decreases, and appearance becomes poor.

The nonaqueous dispersion resin (c) may be prepared by copolymerizing polymerizable monomers in a mixture of a dispersion stabilizing resin and an organic solvent, as a form of uncrosslinked polymer particles insoluble in the mixture. The shell part is composed of the dispersion stabilizing resin, and the core part is composed of a copolymer of the polymerizable monomers.

The polymerizable monomers preferably include a monomer having a functional group so that the functional group to be contained in the resulted nonaqueous dispersion resin (c) can react to the curing agent reactable with hydroxyl group (b), thereby a three dimensionally crosslinked coated film is formed.

The monomer having a functional group typically includes, for example monomers having a hydroxyl group such as hydroxyethyl (meth)acrylate, hydroxypropyl (meth)acrylate, hydroxybutyl (meth)acrylate, hydroxyethyl (meth)acrylate, allyl alcohol, an adduct of hydroxyethyl (meth)acrylate and ε-caprolactone.

The monomer having an acidic group includes those having carboxyl group such as (meth)acrylic acid, crotonic acid, ethacrylic acid, propylacrylic acid, isopropylacrylic acid, itaconic acid, maleic anhydride, fumaric acid and the like; and those having sulfonic acid group such as t-butylacrylamide sulfonic acid and the like. When a monomer having an acidic group is employed, at least a part of the acidic group is preferably a carboxyl group.

Further, a monomer having glycidyl group such as glycidyl (meth)acrylate; and a monomer having isocyanate group such as m-isopropenyl-α, α'-dimethylbenzylisocyanate, isocyanatoethyl acrylate are also employed.

Examples of the other polymerizable monomers include, for example alkyl (meth)acrylates such as methyl (meth)acrylate, ethyl (meth)acrylate, isopropyl (meth)acrylate, n-propyl (meth)acrylate, n-butyl (meth)acrylate, t-butyl (meth)acrylate, isobutyl (meth)acrylate, 2-ethylhexyl (meth)acrylate, n-octyl (meth)acrylate, lauryl (meth)acrylate, stearyl (meth)acrylate, dodecyl (meth)acrylate; adducts of fatty acid and (meth)acrylate having oxirane structure such as an adduct of stearic acid and glycidyl (meth)acrylate; adducts of oxirane having not less than $C_3$ alkyl group and (meth)acrylic acid; styrene, α-methylstyrene, o-methylstyrene, m-methylstyrene, p-methylstyrene, p-t-butylstyrene; benzyl (meth)acrylate; itaconates such as dimethyl itaconate and the like; malates such as dimethyl malate and the like; fumarates such as dimethyl fumarate; (meth)acrylonitrile; methyl isopropenyl ketone; vinyl acetate; VEOVA™ monomer available from Shell Chemical Co., vinyl propionate, vinyl pivalate, vinyl propionate; ethylene, propylene, butadiene, N,N-dimethylaminoethyl (meth)acrylate, acrylamide, vinylpyridine, and the like. These may be employed alone or in combination of two or more.

The polymerizable monomer is preferably polymerized in the presence of a radical polymerization initiator. The radical polymerization initiator includes, for example azoic initiators such as 2,2'-azobisisobutylonitrile, 2,2'-azobis(2,4-dimethylvaleronitrile); peroxide initiators such as benzoyl peroxide, lauryl peroxide, t-butyl peroctoate. The initiator is employed usually 0.2 to 10 pats by weight, preferably 0.5 to 5 parts by weight based on 100 parts of the total polymerizable monomers. The polymerization reaction in an organic solvent containing the dispersion stabilizing resin is preferably conducted at 60 to 160° C. for about 1 to 15 hours.

The dispersion stabilizing resin is not limited to on condition that nonaqueous dispersion resin is stably thynthesized in the organic solvent including it. The dispersion stabilizing resin has a hydroxyl value of 10 to 250, preferably 20 to 180. If the hydroxyl value is less than 10, curability, adhesiveness, and stability and the like decreases, if it is more than 250, dispersion becomes unstable.

The dispersion stabilizing resin has an acid value of 0 to 100 mgKOH/g, preferably 0 to 50 mgKOH/g. If the acid value is more than 100 mgKOH/g, water resistance of the coated film decreases. The dispersion stabilizing resin preferably has a number average molecular weight of 2000 to 10000. If the molecular weight is less than 2000, dispersion becomes unstable, and if it is more than 10000, nonvolatile solid content of the coating composition decreases. The dispersion stabilizing resin preferably has a Tg of not more than 30° C. If the Tg is more than 30° C., the resulting coated film decreases in appearance or tipping resistance.

The dispersion stabilizing resin may be prepared by any conventional method, for example a radically polymerization method in the presence of a radically polymerizing initiator, a condensation reaction method, an addition reaction method are preferred. Specifically, the dispersion stabilizing resin includes an acrylic resin, a polyester resin, a polycarbonate resin, a polyurethane resin and the like.

A monomer employed for preparing the dispersion stabilizing resin may be selected dependent on property of the resin, but it is preferred that the monomer having a functional group such as a hydroxyl group and an acidic group, described above as the polymerizable monomer, and further those having a glycidyl group and an isocyanate group may optionally be employed. The monomer having a functional group makes the functional group to be contained in the resulted nonaqueous dispersion resin (c) which can react to the curing agent reactable with hydroxyl group (b), thereby a three dimensionally crosslinked coated film is formed.

The monomer for preparing the dispersion stabilizing resin preferably contains those having a side chain having not less than 10 carbon atoms in an amount of 10 to 50% by weight based on total amount of the monomer. If the monomer amount is less than 10% by weight, the intermediate coated film may be solubilized with the base coated film. If the monomer amount is more than 50% by weight, separation may be caused in the intermediate coating composition, or inverse or crack may be caused by the intermediate coated film being mixed with the base coated film.

Further, the monomer preferably contains those having a hydrophilic group in an amount of 20 to 50% by weight based on total amount of the monomer. If the monomer amount is less than 20% by weight, curing ability, adhesiveness, and stability may decrease. If the monomer amount is more than 50% by weight, dispersibility may become unstable. The hydrophilic group includes a hydroxyl group, a carboxylic group, an amide group, and an ether group.

An amount ratio of the dispersion stabilizing resin and the polymerizable monomer may optionally be selected dependent on its purpose. For example, the dispersion stabilizing resin is employed in an amount of 3 to 80% by weight, preferably 5 to 60% by weight based on the total weight of the both components. The polymerizable monomer is employed in an amount of 97 to 20% by weight, preferably 95 to 40% by weight. Further, the polymerization solution has a total concentration of the dispersion stabilizing resin and the polymerizable monomer of 30 to 80% by weight, preferably 40 to 60% by weight.

The nonaqueous dispersion resin (c) as obtained above is contained in the intermediate coating composition in an amount of 18 to 50% by weight solid based on the total resin solid of the intermediate coating composition. If the amount is less than 18% by weight or more than 50% by weight, the resulting coated film decreases in appearance. Preferably, the amount is 23 to 45% by weight.

As described above, a pigment component is also contained in the intermediate coating composition. The pigment is contained in an amount of 10 to 70% by weight based on total weight of the pigment and the resin solid. The resin solid means total amount of the solids of the hydroxyl group containing resin (a), the curing agent reactable with hydroxyl group (b), and the nonaqueous dispersion resin (c). If the amount is less than 10% by weight, the intermediate coating composition can not be made to high solid type, it becomes large in volume shrinkage during a baking step, and appearance of the coated film may become poor. If the amount is more than 70% by weight, pigment content becomes excessive, and appearance of the coated film becomes poor.

The pigment is not limited to, but includes those employed in the conventional intermediate coating composition. For example, the pigments described above as for the electrodeposition coating composition, and a planular pigment such as aluminium powder and mica powder. The pigment may be a usual gray type mainly composed of carbon black and titanium dioxide, a set gray type of which brightness or hue was adjusted to the top coating composition, or a colored type composed of a combination of various color pigments.

A conventionally known additives such as a viscosity adjusting agent, a pinhole prevention agent, a dilution solution and the like may be added to the intermediate coating composition. The viscosity adjusting agent includes those polyamide type such as a swelled dispersion of fatty acid amide, phosphate of long chain polyaminoamide; those polyethylene type such as a colloidal swelled dispersion of oxidized polyethylene; those of organic bentonite type such as organic acid smectite clay, montmorillonite; inorganic pigments such as aluminium silicate, barium sulfate; a planular pigment, the shape of which exerts viscosity.

The intermediate coating composition may be prepared by the method known to those skilled in the art, for example, kneading or dispersing the hydroxyl group containing resin (a), the curing agent reactable with hydroxyl group (b), and the nonaqueous dispersion resin (c) with using a kneader or roll.

The resulting intermediate coating composition preferably has a nonvolatile solid content at the time of applying of 40 to 70% by weight. If the nonvolatile solid content is less than 40% by weight, solvent content becomes excessive, and the intermediate coating composition can not be made to high solid type, it becomes large in volume shrinkage during a baking step, and appearance of the coated film may become poor. If the nonvolatile solid content is more than 70% by weight, viscosity of the intermediate coating composition becomes high, and appearance may become poor, or working property may decrease. More preferably the nonvolatile content is 45 to 60% by weight.

All the intermediate coating composition, the base coating composition, and the clear coating composition are preferred to be made to high solid type coating composition in the present invention. By using not only high solid intermediate coating composition, but also using high solid base coating composition and high solid clear coating composition, the volume shrinkage ratio in total of the coated film may be reduced, and appearance of the resulting coated film becomes excellent.

The intermediate coating composition preferably has a volume shrinkage ratio of not more than 45% in the case of being heated at 140° C. for 30 minutes. If the volume shrinkage ratio is more than 45%, hiding property deteriorates, and appearance of the resulting coated film becomes insufficient. More preferably, the volume shrinkage ratio is not more than 40%.

The volume shrinkage ratio of the intermediate coating composition in the case of being heated at 140° C. for 30 minutes may be calculated according to the equation as shown below:

$$\text{Volume shrinkage ratio } (\%) = \frac{(100 - \text{Applied } NV)/(\text{Solvent } SG)}{(100 - \text{Applied } NV)/(\text{Solvent } SG) + (\text{Applied } NV/\text{Dry Film } SG)} \quad \text{I}$$

wherein, the abbreviation NV represents nonvolatile solid content, and SG represents specific gravity. The applied NV means nonvolatile solid content of the applied coated film, and the value may be calculated according to the equation as shown below:

$$\text{Applied } NV\ (\%) = \frac{W3 - W1}{W2 - W1} \times 100 \quad \text{II}$$

wherein, W1 represents weight of the substrate before a coating composition is applied, W2 represents weight of the substrate after a coating composition is applied, and W3 represents weight of the coated substrate after it was dried at 140° C. for 30 minutes. The dry film SG means specific gravity of nonvolatile solid content in coating composition, and the value may be calculated from gravity and compositional ratio of the respective component.

Process for Forming Intermediate Coated Film

The intermediate coating composition may be applied on the cured electrodeposition coated film obtained in Step I to form an intermediate coated film. The applying method to be used is not limited to but includes, for example an air electrostatic spraying method using so-called "react gun", or a method using rotary aerification type electrostatic coating apparatus so-called "micro micro (uu) bell", "micro (u) bell", and "meta bell". Preferred is the method using rotary aerification type electrostatic coating apparatus.

A coated film of the intermediate coating composition has a thickness in dry state of 5 to 40 um though the thickness may be varied depending on its use. If the thickness is more than 40 um, distinctiveness decreases, unevenness or sagging may occur at the time of applying. If the thickness is less than 5 um, an underneath surface is not sufficiently covered, and a coated film may be broken.

Step III

In step III of the present invention, a base coating composition is applied on the uncured intermediate coated film to form an uncured base coated film.

Base Coating Composition

The base coating composition comprises a resin component and a pigment component. The resin component is composed of 10 to 70% by weight solid based on total resin solid of a hydroxyl group containing resin (d), 10 to 70% by weight of a curing agent reactable with hydroxyl group (e), 5 to 50% by weight of a nonaqueous dispersion resin (f), with the proviso (d)+(e)+(f)=100%.

The hydroxyl group containing resin (d) means the resin which has a hydroxyl group and is soluble in a medium employed for the base coating composition, for example includes an acrylic resin and/or a polyester resin. The acrylic resin is preferred because it may be modified so as to have high solubility parameter. The polyester resin includes those derived from polyol and polycarboxylic acid or anhydride thereof.

The hydroxyl group containing resin (d) preferably has a hydroxyl value of 50 to 250, an acid value 1 to 50 mgKOH/g, and a solubility parameter of 9.5 to 12. If the hydroxyl value, acid value, or solubility parameter is more than the upper limits, the resulting coated film decreases in water resistance. If the hydroxyl value or acid value is less than the lower limits, the coating composition decreases in curability, and if the solubility parameter is less than the lower limit, the coated layer may be solubilized with an intermediate coated film or a clear coated film.

The hydroxyl group containing resin (d) has a number average molecular weight of 1000 to 10000, preferably 1100 to 5000, more preferably 1200 to 3000. By employing the resin (d) of such a molecular weight, the base coating composition can be made to high solid type, it becomes small in volume shrinkage during a baking step, and appearance of the resulting coated film improves.

The hydroxyl group containing resin (d) is included in an amount of 10 to 70% by weight solid based on total resin solid of the base coating composition. If the amount is less than 10% by weight, the resulting coated film becomes brittle, or becomes poor in appearance, and deteriorates in basic property as a coated film. If the amount is more than 70% by weight, an amount of the nonaqueous dispersion resin (f) to be combined decreases, and appearance of the resulting coated film becomes poor. The amount is preferably 10 to 50% by weight, more preferably 20 to 50% by weight.

The curing agent reactable with hydroxyl group (e) is not limited to, but includes, for example a melamine resin and/or a block isocyanate resin, and the like. The curing agent (e) is included in an amount of 10 to 70% by weight solid based on total resin solid of the base coating composition. If the amount is less than 10% by weight, curability may become insufficient, or physical property of the coated film may become poor. If the amount is more than 70% by weight, disadvantage in economy may be caused, and appearance of the resulting coated film becomes poor. The amount is preferably 20 to 50% by weight.

A combination of the hydroxyl group containing resin (d) and the curing agent reactable with hydroxyl group (e) is not limited to, but preferably is a combination of acrylic resin and/or polyester resin with melamine resin when pigment dispersing property and working property are considered.

The nonaqueous dispersion resin (f) is a particulate resin composed of a core part having high solubility parameter, and a shell part having low solubility parameter. The resin particles are not soluble in a solvent in the coating composition due to high solubility parameter of the core part, and also have small swelling ratio by a solvent. Further, the core part serves as a viscosity imparting agent, thereby coated layers are prevented from being solubilized or inverted with each other, and color reversion due to slight mixing with the intermediate coated film or with the clear coated film is also prevented. The shell part having low solubility parameter serves as a dispersion stabilizer.

The nonaqueous dispersion resin (f) is made of uncrosslinked particles, and minimum viscosity during a baking step can be made small. The particles however may be crosslinked by the curing agent reactable with hydroxyl group (e), may serve as a film forming component, and may be included in increased amount. Therefore, the base coated film improves in hiding property, distinctiveness, gloss and the like by the nonaqueous dispersion resin (e).

The nonaqueous dispersion resin (f) preferably has a solubility parameter of 11 to 14, and a solubility parameter difference between the core part and the shell part of 0.5 to 3. If the difference is less than 0.5, nonvolatile solid content of the coating composition cannot sufficiently be reduced, dissolution and swelling may be caused. Further, viscosity control effect exerted by the core part decreases, hiding property deteriorates, solubilization with the intermediate coated film or with the clear coated film occurs, and appearance of the resulting coated film becomes insufficient.

If the difference is more than 3, dispersion becomes unstable, separation may occur, inverse or crack may be caused by the base coated film being mixed with the intermediate coated film. The difference of the solubility parameter is preferably 1 to 3.

As to correlation between the solubility parameters of the hydroxyl group containing resin (d) and the nonaqueous dispersion resin (f), it is preferred that the nonaqueous dispersion resin (f) has higher solubility parameter because solubilization with the intermediate coated film or with the clear coated film may be prevented.

The nonaqueous dispersion resin (f) has a hydroxyl value of 100 to 400, preferably 130 to 300. If the hydroxyl value is less than 100, curability of the coating composition decreases, and if it is more than 400, water resistance of the coated film may decrease. The resin (f) has an acid value of 0 to 200 mgKOH/g, preferably 0 to 50 mgKOH/g. If the acid value is more than 200 mgKOH/g, water resistance of the coated film decreases. The resin (f) has an average diameter ($D_{50}$) of 0.05 to 5 um, preferably 0.05 to 1 um. If the average diameter is less than 0.05 um, nonvolatile solid content of the coating composition decreases, and if it is more than 5 um, viscosity control property decreases, and appearance becomes poor.

The nonaqueous dispersion resin (f) may be prepared according to the same manner as that of the nonaqueous dispersion resin (c) employed in the intermediate coating composition. The nonaqueous dispersion resin (f) is contained in the base coating composition in an amount of 5 to 50% by weight solid based on the total resin solid of the base coating composition. If the amount is less than 5% by weight or more than 50% by weight, the resulting coated film becomes poor in appearance. Preferably, the amount is 18 to 45% by weight.

As described above, a pigment component is also contained in the base coating composition. The base coating composition may be prepared as a metallic base coating composition by employing so-called a brilliant pigment, or as a solid base coating composition by employing a coloration pigment such as red, blue and black, and/or an extender pigment without employing the brilliant pigment.

The brilliant pigment is not limited to, but includes, for example uncolored or colored metallic brilliant materials such as metal, alloy and mixture thereof, interference mica powder, colored mica powder, white mica powder, graphite or colorless or colored planular pigment. Preferred is a colorless or colored metallic brilliant material or mixture thereof such as metal or alloy because it is superior in dispersibility, and a coated film having high transparency may be formed. Specific examples of the metal include aluminium, aluminium oxide, copper, zinc, iron, nickel, tin and the like.

Shape of the brilliant pigment is not limited to, furthermore it may be colored. However, for example a scale-like pigment having an average diameter ($D_{50}$) of 2 to 50 um, and a thickness of 0.1 to 5 um is preferred. Those having an average diameter of 10 to 35 um are excellent in brilliant feeling, and preferred. The base coating composition generally has a pigment content (PWC) of not more than 23% by weight. If the PWC is more than 23% by weight, the resulting coated film becomes poor in appearance. Preferably the PWC is 0.01 to 20% by weight, more preferably 0.01 to 18% by weight.

The pigment other than the brilliant pigment is not limited to, but includes those employed for a conventional base coating composition. Examples thereof include the organic coloration pigment, the inorganic coloration pigment, the extender pigment as described above to be employed for the electrodeposition coating composition. The brilliant pigment, the coloration pigment, and the extender pigment, are employed as the pigment alone or in combination of two or more.

The pigment is preferably contained in the base coating composition so that the PWC based on the total amount of the pigment and the resin solid is 1 to 60% by weight. The resin solid in this context means the total amount of solids contained in the hydroxyl group containing resin (d), the curing agent reactable with hydroxyl group (e), and the nonaqueous dispersion resin (f). If the amount is more than 60% by weight, the pigment content becomes excessive, and the resulting coated film decreases in appearance.

A conventionally known additives such as a viscosity adjusting agent, a pinhole prevention agent, a dilution solution and the like may be added to the base coating composition. The viscosity adjusting agent includes those polyamide type such as a swelled dispersion of fatty acid amide, phosphate of long chain polyaminoamide; those polyethylene type such as a colloidal swelled dispersion of oxidized polyethylene; those of organic bentonite type such as organic acid smectite clay, montmorillonite; inorganic pigments such as aluminium silicate, barium sulfate; a planular pigment, the shape of which exerts viscosity.

The base coating composition may be prepared from the hydroxyl group containing resin (d), the curing agent reactable with hydroxyl group (e), the nonaqueous dispersion resin (f), the pigment and the like according to the same manner as that of the intermediate coating composition.

The resulting base coating composition preferably has a nonvolatile solid content at the time of applying of 30 to 60% by weight. If the nonvolatile solid content is less than 30% by weight, a solvent content becomes excessive, and the base coating composition can not be made to high solid type, the resulting coated film increases in volume shrinkage during a baking step, and appearance of the resulting coated film may become poor. If the nonvolatile solid content is more than 60% by weight, viscosity of the base coating composition becomes high, and appearance or working property may decrease. More preferably the nonvolatile solid content is 40 to 50% by weight.

The base coating composition preferably has a volume shrinkage ratio of not more than 45% in the case of being heated at 140° C. for 30 minutes. If the volume shrinkage ratio is more than 45%, hiding property deteriorates, and appearance of the resulting coated film becomes insufficient. More preferably, the volume shrinkage ratio is not more than 40%.

The volume shrinkage ratio of the base coating composition in the case of being heated at 140° C. for 30 minutes may be obtained according to the same manner as described above for the intermediate coating composition (equation I and equation II).

Process for Forming Base Coated Film

The base coating composition may be applied on the uncured intermediate coated film obtained in Step II to form a base coated film. The applying method to be used is not limited to but includes, for example the coating method as described above for the intermediate coated film. When the base coating composition is applied on an automobile body, plural stage coating, preferably two stage coating using an air electrostatic spray, or the applying method using an air electrostatic spray combined with rotary aerification type electrostatic coating apparatus is conducted, in order to increase its aesthetical value.

A coated film of the base coating composition has a thickness in dry state of 5 to 35 um though the thickness may be varied depending on its use. If the thickness is more than 35 um, distinctiveness decreases, unevenness or sagging may occur at the time of applying. If the thickness is less than 5 um, an underneath surface is not sufficiently covered, and a coated film may be broken.

Step IV

In step IV of the present invention, a dear coating composition is applied on the uncured base coated film to form an uncured clear coated film.

Clear Coating Composition

The clear coating composition is formed for protecting the base coated film or for smoothing surface irregularity of the metallic base coated film due to the brilliant pigment contained therein.

The clear coating composition is not limited to, but includes those composed of a film forming resin, a curing agent, and the other additives. The film forming resin is not limited to but includes an acrylic resin, a polyester resin, an epoxy resin, an urethane resin and the like in the same manner as that described for the intermediate coating composition, these are employed in combination with a curing agent such as an amino resin and/or a block isocyanate resin from the viewpoint of its transparency, acid-etching resistance and the like. The preferred film forming resin includes an acrylic resin and/or polyester resin combined with an amino resin, or an acrylic resin and/or polyester resin having acid-epoxy curing system.

The clear coating composition preferably contains a viscosity control agent as an additive because solubilization or inversion between the layers, or sagging is prevented. The viscosity control agent is included in an amount of 0.01 to 10 parts by weight, preferably 0.02 to 8 parts by weight, more preferably 0.03 to 6 parts by weight based on 100 parts by weight resin solid of the clear coating composition. If the amount is more than 10 parts by weight, appearance decreases, and if the amount is 0.1 parts by weight, viscosity control effect is not exerted and problems such as sagging may be caused. The clear coating composition may be prepared in any form of organic solvent based, aqueous based (water solution, water dispersion, emulsion), nonaqueous dispersion, or powder. A curing catalyst, surface modifier and the like are employed if necessary.

The clear coating composition may be prepared according to the method same as that exemplified for intermediate coating composition. When it is a solvent based form, the clear coating composition has a nonvolatile solid content at the time when applying of preferably 40 to 70% by weight, more preferably 45 to 60% by weight. If the nonvolatile solid content is less than 40% by weight, a solvent content becomes excessive, and the clear coating composition can not be made to high solid type, the resulting coated film increases in volume shrinkage during a baking step, and appearance of the resulting coated film may become poor. If the nonvolatile solid content is more than 70% by weight, viscosity of the base coating composition becomes high, and appearance or working property may decrease.

Process for Forming Clear Coated Film

The clear coating composition may be applied on the uncured base coated film obtained in Step III to form a clear coated film. The applying method to be used is not limited to but includes, for example the coating method as described above for the intermediate coated film. A coated film of the clear coating composition preferably has a thickness in dry state of 10 to 70 um though the thickness may be varied depending on its use. If the thickness is more than 70 um, distinctiveness decreases, unevenness or sagging may occur at the time of applying. If the thickness is less than 10 um, an underneath surface is not sufficiently covered, and uncontinuity of the coated film may occur.

In the present specification, the intermediate coated film, the base coated film, and the clear coated film are formed in uncured state. This means that the films are formed by so-called wet on wet in this order. Provided, the uncured state involves the state before which the preheat step has been conducted. For example, the preheat step is conducted by allowing the coated film to stand at from room temperature up to 100° C. for 1 to 10 minutes. In order to obtain improved finish appearance, it is preferred that the preheat step is conducted after the aqueous intermediate coating composition and the aqueous base coating composition is applied.

Step V

In step V of the present invention, the uncured intermediate coated film, the base coated film, and the clear coated film are simultaneously heated and cured to obtain a layered coated film. The heating is preferably conducted at a temperature of 110 to 180° C., more preferably 120 to 160° C. If the curing temperature is more than 180° C., the resulting film becomes hard and brittle, if the curing temperature is less than 110° C., the resulting film becomes unsufficient in curing. Curing time may be varied depending on the curing temperature, but generally for 10 to 60 minutes at 120 to 160° C.

The resulting layered coated film has a thickness of generally 30 to 300 um, preferably 50 to 250 um. If the thickness is more than 300 um, physical property of the coated film such as cool-hot cycle decreases, if the thickness is less than 30 um, strength of the coated film decreases.

Due to the electrodeposition coated film formed in Step I, corrosion resistance is imparted to the substrate. Further, the base coating composition applied in Step III contains nonaqueous dispersion (e), thereby coated layers are prevented from being solubilized or color reversion to obtain a layered film having high appearance.

The present invention will be further explained in detail in accordance with the following examples, however, the present invention is not limited to these examples. In the examples, "part" and "%" are based on weight unless otherwise specified. "Epoxy equivalent" and "amine equivalent" are values per solid content.

PREPARATION EXAMPLE 1

Preparation of Electrodeposition Coating Composition 1.1) Preparation of Amine Modified Epoxy Resin 92 parts of 2,4-/2,6-tolylenediisocyanate (weight ratio=8/2), 95 parts of methyl isobutyl ketone (hereinafter, referred to as MIBK) and 0.5 part of dibutyltin dilaurate were loaded to a flask equipped with a stirrer, a cooling tube, a nitrogen introducing tube, a thermometer and a dropping funnel. 21 parts of methanol was added while stirring the mixture.

Starting at room temperature, the reaction mixture was allowed to rise to 60° C. by exothermic, the reaction was retained for 30 minutes, and 57 parts of ethylene glycol mono-2-ethylhexyl ether was dropped from the dropping funnel. Furthermore, 42 parts of bisphenol A-propylene oxide 5 mol adduct was added. The reaction was carried out mainly in the temperature range of 60 to 65° C., and continued until absorption based on an isocyanate group disappeared in IR spectrum measurement.

Next, 365 parts of bisphenol A type epoxy resin of epoxy equivalent 188 synthesized from bisphenol A and epichlorohydrin in accordance with a known method was added to the reaction mixture and heated to 125° C. After that, 1.0 part of benzyldimetylamine was added and allowed to react at 130° C. until epoxy equivalent became 410.

Subsequently, 87 parts of bisphenol A was added and allowed to react at 120° C. to achieve epoxy equivalent of 1190. Thereafter, the reaction mixture was cooled, and 11 parts of diethanolamine, 24 parts of N-ethylethanolamine and 25 parts of 79% solution in MIBK of ketimined aminoethyl ethanolamine were added, and was allowed to react for 2 hours at 110° C. Then, the reaction mixture was diluted with MIBK until nonvolatile solid content became 80%, and an amine modified epoxy resin having a glass transition temperature of 22° C. (solid content: 80%) was obtained.

1.2) Preparation of Block Polyisocyanate Curing Agent 1250 parts of diphenylmethanediisocyanate, 266.4 parts of MIBK were loaded to a flask, this was heated to 80° C., and 2.5 parts of dibutyltin dilaurate were added to this. A solution of 226 parts of ε-caprolactam dissolved in 944 parts of ethylene glycol monobutyl ether was dropped thereto at 80° C. over 2 hours. The reaction was retained at 100° C. for 4 hours, it was confirmed that absorption based on an isocyanate group disappeared in IR spectrum measurement, and left to be cooled. 336.1 parts of MIBK were added and thereby, a block polyisocyanate curing agent was obtained.

1.3) Preparation of Pigment Dispersing Resin 222.0 parts of isophoronediisocyanate (hereinafter, referred to as IPDI) was loaded in a reaction vessel equipped with a stirrer, a cooling tube, a nitrogen introducing tube and a thermometer, and after diluted with 39.1 parts of MIBK, 0.2 part of dibutyltin dilaurate was added. Then, the reaction mixture was heated to 50° C., and 131.5 parts of 2-ethyl hexanol was dropped under dry nitrogen atmosphere over 2 hours with stirring. Reaction temperature was kept at 50° C. by cooling as necessary. As a result of this, 2-ethyl hexanol half blocked IPDI (solid content: 90%) was obtained.

87.2 parts of dimethylethanolamine, 117.6 parts of 75% aqueous solution of lactic acid, and 39.2 parts of ethylene glycol monobutyl ether were added to a suitable reaction vessel, the reaction mixture was stirred at 65° C. for half an hour to prepare a quaternarizing agent.

Subsequently 710.0 parts of EPON 829 (bisphenol A type epoxy resin manufactured by Shell Chemical Company, epoxy equivalents 193 to 203), and 289.6 parts of bisphenol A were loaded to a reaction vessel. The reaction mixture was heated to 150 to 160° C. under nitrogen atmosphere, exothermic reaction was initially occurred. Heating was continued at 150 to 160° C. for about 1 hour, the reaction mixture was then cooled to 120° C., 498.8 parts of the prepared 2-ethyl hexanol half-blocked IPDI (MIBK solution) was added.

The reaction mixture was held at 110 to 120° C. for 1 hour, 1390.2 parts of ethylene glycol monobutyl ether were added, the mixture was cooled to 85 to 95° C., homogenized, and 196.7 parts of the prepared quaternarizing agent was added thereto. The reaction mixture was held at 85 to 95° C. until the acid value became 1, 37.0 parts of deionized water were added to finalize quaternarization of an epoxy-bisphenol A resin and to obtain a pigment dispersing resin having quaternary ammonium moiety (solid content: 50%).

1.4) Preparation of Pigment Dispersion Paste 120 parts of the pigment dispersing resin obtained in Preparation example 3, 2.0 parts of carbon black, 100.0 parts of kaolin, 80.0 parts of titanium dioxide, 18.0 parts of aluminum phosphomolibudate and 221.7 parts of ion-exchange water were loaded into a sand grinding mill, and they were dispersed until grain size was not more than 10 um, to obtain a pigment dispersion paste (solid content: 48%).

PREPARATION EXAMPLE 2

Preparation of Intermediate Coating Composition 2.1) Preparation of Acrylic Resin In a reaction vessel equipped with a stirrer, a temperature control unit, and a reflux cooler, 82 parts of xylene was loaded and 20 parts of a solution containing the following components was added. This reaction mixture was heated with stirring and allowed to raise temperature.

TABLE 1

| methacrylic acid | 4.5 parts |
|---|---|
| ethyl acrylate | 26.0 parts |
| PLACCEL FM-1*1 | 64.5 parts |
| MSD-100*2 | 5.0 parts |
| azoisobutyronitrile | 13.0 parts |

*1hydroxyl group containing monomer available from Daicel Kagaku Kogyo K.K.
*2methylstyrene dimer available from Mitsui Kagaku K.K.

93.0 parts of the remainder of the solution was dropwise added to the reaction mixture with refluxing over 3 hours, and a solution composed of 1.0 parts of azoisobutyronitrile and 12 parts of xylene was dropwise added over 30 minutes. The reaction mixture was refluxed further 1 hour, 63 parts of a solvent was distilled out under reduced pressure to terminate the reaction. An acryl resin varnish having a solid content of 75%, a number average molecular weight of 2000 was obtained.

2.2) Preparation of Nonaqueous Dispersion Resin (a) Preparation of Dispersion Stabilizing Resin In a reaction vessel equipped with a stirrer, a temperature control unit, and a reflux cooler, 90 parts of butyl acetate was loaded and 20 parts of a solution containing the following components was added. This reaction mixture was heated with stirring and allowed to raise temperature.

TABLE 2

| methyl methacrylate | 38.9 parts |
|---|---|
| stearyl methacrylate | 38.8 parts |
| 2-hydroxyethyl acrylate | 22.3 parts |
| azoisobutyronitrile | 5.0 parts |

85 parts of the remainder of the solution was dropwise added to the reaction mixture at 110° C. over 3 hours, and a solution composed of 0.5 parts of azoisobutyronitrile and 10 parts of butyl acetate was added over 30 minutes. The reaction mixture was refluxed further 2 hours for raising the conversion ratio to resin to terminate the reaction. An acryl resin varnish having a solid content of 50%, a number average molecular weight of 5600, a solubility parameter of 9.5 was obtained.

(b) Preparation of Nonaqueous Dispersion Resin

In a reaction vessel equipped with a stirrer, a temperature control unit, and a reflux cooler, 35 parts of butyl acetate was loaded and 60 parts of the acryl resin varnish obtained in Preparation (a) was added. To this was added a solution containing the following components over 3 hours at 100° C.

TABLE 3

| styrene | 7.0 parts |
|---|---|
| methacrylic acid | 1.8 parts |
| methyl methacrylate | 12.0 parts |
| ethyl acrylate | 8.5 parts |
| 2-hydroxyethyl acrylate | 40.7 parts |
| azoisobutyronitrile | 1.4 parts |

A solution composed of 0.1 parts of azoisobutyronitrile and 1 part of butyl acetate was further added over 30 minutes, and this was stirred for 1 hour to obtain an emulsion having a solid content of 60%, and a particle diameter of 0.18 um. This emulsion was diluted with butyl acetate so that a butyl acetate dispersion having a viscosity of 300 cps (25° C.), a particle diameter of 0.18 um, and a solid content of 40% was obtained. The nonaqueous dispersion resin contained therein had a Tg of 23° C., a hydroxyl value of 162, a solubility parameter of 11.8, and a difference between the core part and the shell part of 2.3.

2.3) Preparation of Intermediate Coating Composition

To a 2 liter vessel, 328 parts of the acryl resin varnish obtained in Preparation 2.1, 973 parts of titanium oxide CR-93™ available from Ishihara Sangyo K.K., 10 parts of carbon black FW-200P™ available from Degussa Co. Ltd., 159 parts of butyl acetate, and 82 parts of xylene were added.

An amount in weight equal to the materials loaded above of glass beads (GB503M™) having a particle diameter of 1.6 mm was added, and this was dispersed with a desktop SG mill for 3 hours. The dispersion had a particle size of not less than 5 um. 81.8 parts of xylene was added, the resulted dispersion was stirred for about 10 minutes, glass beads were filtered out, and a pigment dispersion paste was obtained. This pigment dispersion paste was combined with the acryl resin, the nonaqueous dispersion resin, and the curing agent so as to be the resin solid weight ratio as shown in Table 4, to obtain an intermediate coating composition.

PREPARATION EXAMPLE 3

Preparation of Intermediate Coating Composition

To a 2 liter vessel, 328 parts of the acryl resin varnish obtained in Preparation 2.1, 973 parts of titanium oxide CR-93™ available from Ishihara Sangyo K.K., 10 parts of carbon black FW-200P™ available from Degussa Co. Ltd., 159 parts of butyl acetate, and 82 parts of xylene were added.

An amount in weight equal to the materials loaded above of glass beads (GB503M™) having a particle diameter of 1.6 mm was added, and this was dispersed with a desktop SG mill for 3 hours. The dispersion had a particle size of not less than 5 um. 81.8 parts of xylene was added, the resulted dispersion was stirred for about 10 minutes, glass beads were filtered out, and a pigment dispersion paste was obtained. This pigment dispersion paste was combined with the acryl resin, the nonaqueous dispersion resin, and the curing agent so as to be the resin solid weight ratio as shown in Table 4, to obtain an intermediate coating composition.

TABLE 4

|  | PEx. 2 | PEx. 3 |
| --- | --- | --- |
| acryl resin | 35 parts | 50 parts |
| nonaqueous dispersion resin | 35 parts | 20 parts |
| CYMEL 254*1 | 30 parts | 30 parts |
| pigment | 60 parts | 60 parts |

*1 methyl-butyl mixed type melamine resin available from Mitsui Kagaku K.K.

PREPARATION EXAMPLE 4

Preparation of Base Coating Composition and Clear Coating Composition

A black base coating composition SPM-1300 black™ available from Nippon Paint K.K. was arranged as a base coating composition. A coating composition MAC 0-1330™ available from Nippon Paint K.K. was arranged as a clear coating composition.

EXAMPLE 1

The amine-modified epoxy resin obtained in Preparation example 1.1 and the block polyisocyanate curing agent obtained in Preparation example 1.2 were uniformly mixed in solid content ratio of 70:30. Ethylene glycol 2-ethylhexyl ether was then added so that the amount based on solid content was 2%, and glacial acetic acid was added so that milligram equivalent value of acid based on 100 g of the binder resin solid content MEQ(A) was 18, and ion-exchanged water was slowly added for dilution. MIBK was removed under reduced pressure to obtain an emulsion having a solid content of 36%.

2222 parts of this emulsion, 1759 parts of ion-exchanged water, 19 parts of 10% cerium acetate aqueous solution, and 16 parts of dibutyltin oxide were mixed, and a cationic electrodeposition coating composition 1 having a solid content of 20.0% was obtained. This electrodeposition coating composition had substantially no pigment, a volatile organic content in the coating composition (VOC) of 0.4%, a milligram equivalent value of acid based on 100 g of the binder resin solid content (MEQ(A)) of 20.4, and a total concentration of the eluted cerium ion and zinc ion of 190 ppm.

Electrodeposition coating was conducted using the coating composition on a cold rolled steel plate which had been treated with phosphoric acid, at an appropriate voltage so that the electrodeposition coated film after baking had a thickness of 15 um. The coated film was rinsed with deionized water, and was baked at 170° C. for 20 minutes to obtain a cured coated film.

The electrodeposition coated plate was put on a moving plate equipped on a conveyer belt of a coating apparatus. The intermediate coating composition obtained in Preparation example 2 was applied on the electrodeposition coated plate, after 10 minutes the base coating composition was applied, after 2.5 minutes the base coating composition was applied again (two stage coating), and after 20 minutes the clear coating composition was applied. The coating conditions were shown in Table 5 in detail. The intermediate coated film, the base coated film and the clear coated film applied were baked and cured at 140° C. for 30 minutes.

TABLE 5

| Gun model | intermediate uu bell (rotary aerification) | base 1 meta bell (rotary aerification) | base 2 react gun (air aerification) | clear uu bell (rotary aerification) |
| --- | --- | --- | --- | --- |
| Rotation number (rpm) | 25000 | 25000 | — | 25000 |
| Discharge amount (cc/min) | 95 | 210 | 220 | 200 |
| Voltage (kV) | −90 | −60 | −90 | −90 |
| Conveyer speed (m/min) | 1.7 | 1.7 | 1.7 | 1.7 |

EXAMPLE 2

The amine-modified epoxy resin obtained in Preparation example 1.1 and the block polyisocyanate curing agent obtained in Preparation example 1.2 were uniformly mixed in solid content ratio of 70:30. Ethylene glycol 2-ethylhexyl ether was then added so that the amount based on solid content was 2%, and glacial acetic acid was added so that milligram equivalent value of acid based on 100 g of the binder resin solid content MEQ(A) was 24, and ion-exchanged water was slowly added for dilution. MIBK was removed under reduced pressure to obtain an emulsion having a solid content of 36%.

1960 parts of this emulsion, 197 parts of the pigment dispersion paste obtained in the Preparation example 1.4, 1805 parts of ion-exchanged water, 38 parts of 10% cerium acetate aqueous solution, and 14.5 parts of dibutyltin oxide were mixed, and a cationic electrodeposition coating composition 2 having a solid content of 20.0% was obtained. This electrodeposition coating composition had a solid content ratio by weight between the pigment and the total resin (P/V) of 1/10, a VOC of 0.9%, a MEQ(A) of 25.2, and a total concentration of the eluted cerium ion and zinc ion of 420 ppm.

A layered coated film was prepared according to substantially the same manner as described in Example 1, except that the electrodeposition coating composition 2 was employed instead of the electrodeposition coating composition 1.

EXAMPLE 3

A layered coated film was prepared according to substantially the same manner as described in Example 1, except that the intermediate coating composition obtained in Preparation example 3 was employed instead of that of Preparation example 2.

COMPARATIVE EXAMPLE 1

The amine-modified epoxy resin obtained in Preparation example 1.1 and the block polyisocyanate curing agent obtained in Preparation example 1.2 were uniformly mixed in solid content ratio of 70:30. Ethylene glycol 2-ethylhexyl ether was then added so that the amount based on solid content was 1%, and glacial acetic acid was added so that milligram equivalent value of acid based on 100 g of the binder resin solid content MEQ(A) was 35, and ion-exchanged water was slowly added for dilution. MIBK was removed under reduced pressure to obtain an emulsion having a solid content of 36%.

1500 parts of this emulsion, 542 parts of the pigment dispersion paste obtained in Preparation example 1.4, 1901 parts of ion-exchanged water, 57 parts of 10% cerium acetate aqueous solution, and 9 parts of dibutyltin oxide were mixed, and a cationic electrodeposition coating composition 3 having a solid content of 20.0% was obtained. This electrodeposition coating composition had a P/V of 1/3, a VOC of 1.5%, a MEQ(A) of 30.3, and a total concentration of the eluted cerium ion and zinc ion of 610 ppm.

A layered coated film was prepared according to substantially the same manner as described in Example 1, except that the electrodeposition coating composition 3 was employed instead of the electrodeposition coating composition 1.

COMPARATIVE EXAMPLE 2

2222 parts of the emulsion obtained in Comparative example 1, 1778 parts of ion-exchanged water, 57 parts of 10% cerium acetate aqueous solution, and 9 parts of dibutyltin oxide were mixed, and a cationic electrodeposition coating composition 4 having a solid content of 20.0% was obtained. This electrodeposition coating composition had substantially no pigment, a VOC of 0.2%, a MEQ(A) of 34.7, and a total concentration of the eluted cerium ion and zinc ion of 590 ppm.

A layered coated film was prepared according to substantially the same manner as described in Example 1, except that the electrodeposition coating composition 4 was employed instead of the electrodeposition coating composition 1.

Evaluation Method

The electrodeposition coating compositions prepared in Examples and Comparative Examples were evaluated as shown in the following procedures. Results were shown in Table 6.

(1) Evaluation of Electrodeposition Coating Composition (A) Throwing Power

Ford pipe method was conducted. Evaluation was made according to the following criteria.
Good: not less than 21 cm
Poor: less than 21 cm (B) Salt Dipping Corrosion Resistance Electrodeposition coating was conducted on a cold rolled steel plate which had been treated with phosphoric acid so that the resulting electrodeposition coated film had a thickness in dry state of 20 um. The coated film was rinsed with deionized water, and was baked at 170° C. for 25 minutes to obtain a cured coated film. A linear flaw reaches a surfaces of the steel plate having suitable length was made on the coated film with a cutter knife.

The coated steel plate was dipped into 5% brine at 55° C. for 240 hours. CELLOPHANE TAPE™ available from Nichiban K.K. was fixed on the surface of the coated film so that the flaw was covered, the tape was then rapidly peeled. The coated film was partly removed with the tape along the flaw at certain width. Evaluation was made in accordance with maximum width of the removed part with the following criteria.
Good: less than 3 mm
Middle: 3 to 6 mm
Poor: more than 6 mm (C) Smoothness Electrodeposition coating was conducted on a cold rolled steel plate which had not been treated so that the resulting electrodeposition coated film had a thickness in dry state of 20 um. The coated film was rinsed with deionized water, and was baked at 160° C. for 10 minutes to obtain a cured coated film. Surface roughness (Ra) of the cured coated film was measured by using a surface roughness meter SURFTEST-211 (manufactured by Mitsutoyo K.K.) under a cut off of 0.8 mm, and a scan length of 4 mm. Evaluation was made according to the following criteria.
Good: less than 0.2 um of Ra
Poor: not less than 0.2 um of Ra (D) Storage Stability The electrodeposition coating composition was stored at 40° C. for 2 weeks. Then, it was filtrated with using a mesh of No. 380. Evaluation was made according to the following criteria.
Good: Passed through
Poor: Not passed through

TABLE 6

| Coating Composition | Ex. 1 | Ex. 2 | Ex. 3 | CEx. 1 | CEx. 2 |
|---|---|---|---|---|---|
| Pigment amount (%/solid) | 0 | 9.1 | 0 | 25.0 | 0 |
| VOC (%) | 0.4 | 0.9 | 0.4 | 1.5 | 0.2 |
| MEQ (A) (mgeq.) | 20.4 | 25.2 | 20.4 | 30.3 | 34.7 |
| Metal ion conc. (ppm) | 190 | 420 | 190 | 610 | 590 |
| Throwing power | G | G | G | P | P |
| Corrosion resist. | G | G | G | G | G |
| Smoothness | G | G | G | P | P |
| Stability | G | G | G | G | G |

(2) Evaluation of Intermediate Coating Composition

Solvent Resistance

The intermediate coating composition was coated on tin plate to 20 um thick, and dried at 80° C. for 10 minutes. Three organic solvents typically employed for coating composition, that is S-150 aromatic organic solvent available from Exxon Corporation, xylene, and ethyl 2-ethoxypropionate (EEP) were spotted in one drop on the coated surface respectively. After it was allowed to stand still for 30 seconds, the coated surface was made to 45° tilt, and the surface condition was observed. Evaluation was made according to the following criteria. Results were shown in Table 7.
Good: No change
Middle: Swelled
Poor: Dissolved (3) Evaluation of Intermediate, Base and Clear Coated Film 3.1) Applied NV (Nonvolatile Solid Content)

The following procedure was conducted as to every coating compositions, and values calculated were shown in Table 7.

An aluminium foil was weighed (W1), and was applied to a steel plate using a masking tape. A surface of the aluminium foil was masked with a paperboard having a rectangular hole of 5 cm×10 cm. A coating composition was applied to the aluminium surface so that the rectangular hole was filled with the coating composition. The paperboard was removed from the aluminium foil, and the coated aluminium foil was weighed (W2). Thereafter, this was dried at 140° C. for 30 minutes. The coated aluminium foil after being dried was weighed (W3). Applied NV (%) was calculated according to equation II.

3.2) Volume Shrinkage Ratio

Volume shrinkage ratio (%) was calculated according to equation I. Total volume shrinkage ratio (%) was calculated according to the following equation III. The results were shown in Table 7.

The solvent SG (specific gravity) was calculated from solvent composition as to every coating compositions, and to be 0.87 for the intermediate coating composition and the clear coating composition, and 0.86 for the base coating composition. The dry film SG was calculated from composition as to every coating compositions, and to be 1.64 for the intermediate coating composition, 1.23 for the base coating composition, and 1.12 for the clear coating composition.

$$VSR_{total}(\%)=VSR_{inter}\times(DFT_{inter}/DFT_{total})+VSR_{base}\times(DFT_{base}/DFT_{total})+VSR_{clear}\times(DFT_{clear}/DFT_{total}) \quad \text{III}$$

wherein the abbreviation VSR represents volume shrinkage ratio, DFT represents dry film thickness, the subscript "inter" means the value is for the intermediate coated film, "base" means the value is for the base coated film, and "clear" means the value is for the clear coated film, and "total" means the value is for the sum total of the intermediate, base and clear coated films.

(4) Evaluation of Layered Coated Film

A surface of the layered coated film was tested in smoothness by measuring SW value using the WAVESCAN manufactured by Big Chemie Co., Ltd. The smaller the resulting SW value, the better the surface smoothness. The results were shown in Table 7.

TABLE 7

|  | Ex. 1 | Ex. 2 | Ex. 3 | CEx. 1 | CEx. 2 |
| --- | --- | --- | --- | --- | --- |
| ED coatings*1 | ED 1 | ED 2 | ED 1 | ED 3 | ED 4 |
| Inter. coatings*2 | PEx. 2 | PEx. 2 | PEx. 3 | PEx. 2 | PEx. 3 |
| $NV_{inter}$/% | 51 | 51 | 50 | 51 | 50 |
| DFT/um |  |  |  |  |  |
| inter. | 21 | 21 | 19 | 21 | 19 |
| base | 15 | 15 | 17 | 15 | 17 |
| clear | 39 | 39 | 41 | 39 | 41 |
| Applied NV/% |  |  |  |  |  |
| inter. | 78 | 78 | 76 | 78 | 76 |
| base | 77 | 77 | 76 | 77 | 76 |
| clear | 65 | 65 | 65 | 65 | 65 |
| VSR/% |  |  |  |  |  |
| inter. | 34.7 | 34.7 | 37.3 | 34.7 | 37.3 |
| total | 32.7 | 32.7 | 33.4 | 32.7 | 33.4 |
| Solvent resist. of inter. |  |  |  |  |  |
| EEP | G | G | G | G | G |
| Xylene | G | G | G | G | G |
| S-150 | G | G | G | G | G |
| SW value | 13 | 12 | 14 | 25 | 26 |

*1 electrodeposition coating composition
*2 intermediate coating composition

What is claimed is:

1. A process for forming a layered coated film comprising: a step I in which an electrodeposition coated film is formed on a substrate to be coated by an electrodeposition coating process with using a cationic electrodeposition coating composition, and the electrodeposition coated film is heated to form a cured electrodeposition coated film; a step II in which an intermediate coating composition is applied to the cured electrodeposition coated film to form an uncured intermediate coated film; a step III in which a base coating composition is applied to the uncured intermediate coated film to form an uncured base coated film; a step IV in which a clear coating composition is applied to the uncured base coated film to form an uncured clear coated film; and a step V in which the uncured intermediate coated film, base coated film, and clear coated film are simultaneously heated and cured; wherein
   the cationic electrodeposition coating composition is a lead-free cationic electrodeposition coating composition which comprises an aqueous medium, a binder resin composed of a cationic epoxy resin and a blocked isocyanate curing agent dispersed or dissolved in the aqueous medium, a neutralizing acid in order to neutralize the cationic epoxy resin, an organic solvent, and a metal catalyst, and which has a volatile organic content of 1% by weight or less, a metal ion content of 500 ppm or less, a neutralizing acid amount of 10 to 30 mg equivalent based on 100 g of binder resin solid content, and
   the intermediate coating composition comprises a resin component composed of 10 to 70% by weight solid based on total resin solid of a hydroxyl group containing resin (a), 10 to 70% by weight of a curing agent reactable with hydroxyl group (b), 18 to 50% by weight of a nonaqueous dispersion resin (c), with the proviso (a)+(b)+(c)=100%, and a pigment component.

2. The process for forming a layered coated film according to claim 1, wherein the metal ion of the lead-free cationic electrodeposition coating composition is one or more selected from the group consisting of cerium ion, bismuth ion, copper ion, zinc ion, molybdenum ion, and aluminium ion.

3. The process for forming a layered coated film according to claim 1, wherein the neutralizing acid of the lead-free cationic electrodeposition coating composition is one or more selected from the group consisting of acetic acid, lactic acid, formic acid, and sulfamic acid.

4. The process for forming a layered coated film according to claim 1, wherein the lead-free cationic electrodeposition coating composition further comprises a pigment in a ratio of 1/9 or less by weight based on a resin solid contained in the coating composition.

5. The process for forming a layered coated film according to claim 1, wherein the intermediate coating composition has a volume shrinkage ratio of not more than 45% in the case of being heated at 140° C. for 30 minutes.

6. The process for forming a layered coated film according to claim 1, wherein the intermediate coating composition comprises 10 to 70% by weight based on solid in the coating composition of a pigment.

7. The process for forming a layered coated film according to claim 1, wherein the intermediate coating composition has a nonvolatile solid content of 40 to 70% by weight.

8. A process for forming a layered coated film comprising: a step I in which an electrodeposition coated film is formed on a substrate to be coated by an electrodeposition coating process with using a cationic electrodeposition coating composition, and the electrodeposition coated film is heated to form a cured electrodeposition coated film; a step II in which an intermediate coating composition is applied to the cured electrodeposition coated film to form an uncured intermediate coated film; a step III in which a base coating composition is applied to the uncured intermediate coated film to form an uncured base coated film; a step IV in which a clear coating composition is applied to the uncured base coated film to form an uncured clear coated film; and a step V in which the uncured intermediate coated film, base coated film, and clear coated film are simultaneously heated and cured; wherein the cationic electrodeposition coating composition is a lead-free cationic electrodeposition coating composition which comprises an aqueous medium, a binder resin composed of a cationic epoxy resin and a blocked isocyanate curing agent dispersed or dissolved in the aqueous medium, a neutralizing acid in order to neutralize the cationic epoxy resin, an organic solvent, and a metal catalyst, and which has a volatile organic content of 1% by weight or less, a metal ion content of 500 ppm or less, a neutralizing acid amount of 10 to 30 mg equivalent based on 100 g of binder resin solid content, and the base coating composition comprises a resin component composed of 10 to 70% by weight solid based on total resin solid of a hydroxyl group containing resin (d), 10 to 70% by weight of a curing agent reactable with hydroxyl group (e), 5 to 50% by weight of a nonaqueous dispersion resin (f), with the proviso (d)+(e)+(f)=100%, and a pigment component.

9. The process for forming a layered coated film according to claim 8, wherein the metal ion of the lead-free cationic electrodeposition coating composition is one or more selected from the group consisting of cerium ion, bismuth ion, copper ion, zinc ion, molybdenum ion, and aluminium ion.

10. The process for forming a layered coated film according to claim 8, wherein the neutralizing acid of the lead-free cationic electrodeposition coating composition is one or more selected from the group consisting of acetic acid, lactic acid, formic acid, and sulfamic acid.

11. The process for forming a layered coated film according to claim 8, wherein the lead-free cationic electrodeposition coating composition further comprises a pigment in a ratio of 1/9 or less by weight based on a resin solid contained in the coating composition.

12. The process for forming a layered coated film according to claim 8, wherein the base coating composition has a volume shrinkage ratio of not more than 45% in the case of being heated at 140° C. for 30 minutes.

13. The process for forming a layered coated film according to claim 9, wherein the base coating composition comprises 1 to 60% by weight based on solid in the coating composition of a pigment.

14. The process for forming a layered coated film according to claim 8, wherein the base coating composition has a nonvolatile solid content of 30 to 60% by weight.

15. A process for forming a layered coated film comprising: a step I in which an electrodeposition coated film is formed on a substrate to be coated by an electrodeposition coating process with using a cationic electrodeposition coating composition, and the electrodeposition coated film is heated to form a cured electrodeposition coated film; a step II in which an intermediate coating composition is applied to the cured electrodeposition coated film to form an uncured intermediate coated film; a step III in which a base coating composition is applied to the uncured intermediate coated film to form an uncured base coated film; a step IV in which a clear coating composition is applied to the uncured base coated film to form an uncured clear coated film; and a step V in which the uncured intermediate coated film, base coated film, and clear coated film are simultaneously heated and cured; wherein the cationic electrodeposition coating composition is a lead-free cationic electrodeposition coating composition which comprises an aqueous medium, a binder resin composed of a cationic epoxy resin and a blocked isocyanate curing agent dispersed or dissolved in the aqueous medium, a neutralizing acid in order to neutralize the cationic epoxy resin, an organic solvent, and a metal catalyst, and which has a volatile organic content of 1% by weight or less, a metal ion content of 500 ppm or less, a neutralizing acid amount of 10 to 30 mg equivalent based on 100 g of binder resin solid content, and the intermediate coating composition comprises a resin component composed of 10 to 70% by weight solid based on total resin solid of a hydroxyl group containing resin (a), 10 to 70% by weight of a curing agent reactable with hydroxyl group (b), 18 to 50% by weight of a nonaqueous dispersion resin (c), with the proviso (a)+(b)+(c)=100%, and a pigment component, and the base coating composition comprises a resin component composed of 10 to 70% by weight solid based on total resin solid of a hydroxyl group containing resin (d), 10 to 70% by weight of a curing agent reactable with hydroxyl group (e), 5 to 50% by weight of a nonaqueous dispersion resin (f), with the proviso (d)+(e)+(f)=100%, and a pigment component.

16. The process for forming a layered coated film according to claim 15, wherein the metal ion of the lead-free cationic electrodeposition coating composition is one or more selected from the group consisting of cerium ion, bismuth ion, copper ion, zinc ion, molybdenum ion, and aluminium ion.

17. The process for forming a layered coated film according to claim 15, wherein the neutralizing acid of the lead-free cationic electrodeposition coating composition is one or more selected from the group consisting of acetic acid, lactic acid, formic acid, and sulfamic acid.

18. The process for forming a layered coated film according to claim 15, wherein the lead-free cationic electrodeposition coating composition further comprises a pigment in a ratio of 1/9 or less by weight based on a resin solid contained in the coating composition.

19. The process for forming a layered coated film according to claim 15, wherein the intermediate coating composition has a volume shrinkage ratio of not more than 45% in the case of being heated at 140° C. for 30 minutes.

20. The process for forming a layered coated film according to claim 15, wherein the intermediate coating composition comprises 10 to 70% by weight based on solid in the coating composition of a pigment.

21. The process for forming a layered coated film according to claim 15, wherein the intermediate coating composition has a nonvolatile solid content of 40 to 70% by weight.

22. The process for forming a layered coated film according to claim 15, wherein the base coating composition has a volume shrinkage ratio of not more than 45% in the case of being heated at 140° C. for 30 minutes.

23. The process for forming a layered coated film according to claim 15, wherein the base coating composition comprises 1 to 60% by weight based on solid in the coating composition of a pigment.

24. The process for forming a layered coated film according to claim 15, wherein the base coating composition has a nonvolatile solid content of 30 to 60% by weight.

* * * * *